June 4, 1929.  B. C. CHANDLER  1,715,991
WINDSHIELD WIPER
Filed Aug. 23, 1926
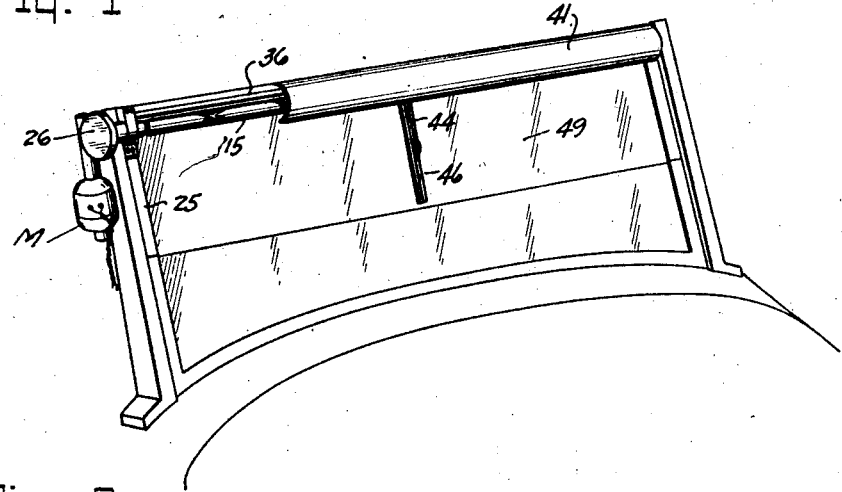
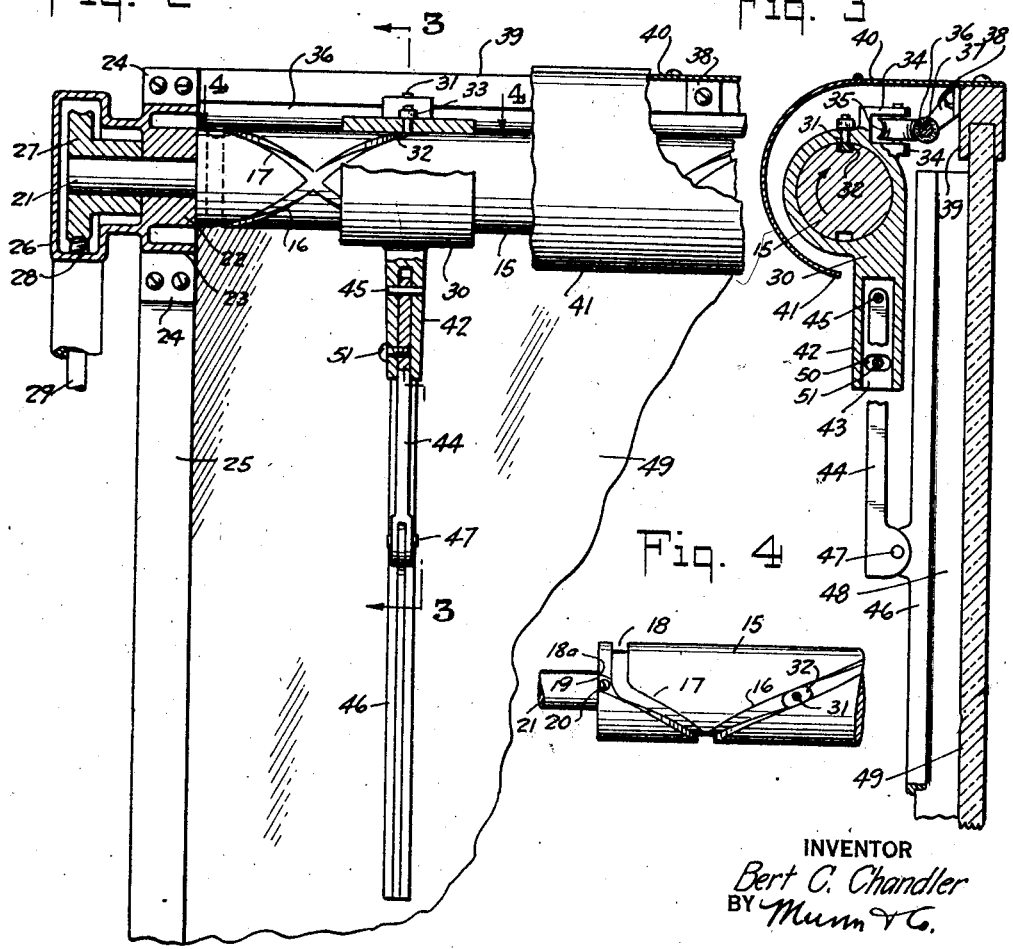
INVENTOR
*Bert C. Chandler*
BY *Munn & Co.*
ATTORNEYS Patented June 4, 1929.

1,715,991

UNITED STATES PATENT OFFICE.

BERT C. CHANDLER, OF MOUNT LOWE, CALIFORNIA.

WINDSHIELD WIPER.

Application filed August 23, 1926. Serial No. 131,065.

My invention relates to wind shield wipers as used on motor vehicles.

It is a purpose of my invention to provide a power operated wind shield wiper which is operable in its association with a wind shield to continuously wipe the wind shield from end to end and for that portion within the normal line of vision of the occupants of the front seat of a motor vehicle so that the occupants and particularly the operator can have a clear view of all in advance of vehicle when driving, thus greatly reducing the possibility of accident because of impaired vision as a result of inclement weather.

It is also a purpose of my invention to provide a wind shield wiper which possesses the desirable characteristics of simplicity, durability, effectiveness, and which in actual use when operating or at rest will not rattle.

I will describe only one form of wind shield wiper embodying my invention, and will then point out the novel features thereof in claims.

In the drawings

Figure 1 is a view showing in perspective one form of wind shield wiper in applied position to a wind shield of a motor vehicle;

Figure 2 is an enlarged fragmentary sectional view of the wiper in applied position to the wind shield;

Figure 3 is a vertical sectional view taken on the line 3—3 of Figure 2;

Figure 4 is a sectional view taken on the line 4—4 of Figure 2.

Referring specifically to the drawings, my invention in its present embodiment comprises a shaft 15 the periphery of which is formed with two spiral grooves 16 and 17 disposed in intersecting relation to each other and substantially co-extensive in length with the shaft, the ends of the grooves being connected by circumferentially extending grooves 18 (Figure 4). One of the grooves 18 is provided with a branch groove 18ª in which is fitted a plug or stop 19 secured therein by a screw 20. The purpose of this plug will be described hereinafter.

The opposite ends of the shafts 15 are provided with reduced extensions 21 journaled in brackets, each including an inner annulus 22 in which the extension is journaled and an outer annulus 23 spaced from and disposed concentrically of the inner annulus. The outer annulus 23 carries a pair of lips 24 through which screws are adapted to extend for securing the bracket as a unit to the frame 25 of an inner shield. As shown in Figure 2, one of the brackets carries a housing 26 to accommodate a worm gear 27 which is keyed to the corresponding extension 21. The gear 27 constantly meshes with a worm 28 fixed on the shaft 29 of a motor, the mechanism described being designed for constantly rotating the shaft 15 in one direction.

Movable longitudinally on the shaft 15 is a carriage 30 in the form of a sleeve in which is removably mounted a pin 31 having a head 32 of the elongated form shown in Figure 4 which is adapted to ride in the grooves 16 and 17. The upper end of the pin is threaded to receive a nut 33 for securing the head in fixed position within the carriage. This pin 31 is insertable into the carriage simultaneously with the application of the carriage to the shaft, the head 32 being insertable into the groove 16 or 17 by removing the plug 19. Of course the plug is subsequently returned to position to prevent the accidental movement of the head from the groove, as will be understood.

As illustrated to advantage in Figure 3, the carriage is provided with spaced ears 34 in which is journaled a grooved roller 35 which has rotating engagement with a track 36 in the form of a rod having a covering 37 of rubber or other suitable material for the purpose of eliminating noise in the movement of the roller on the track. The rod 36 is rigidly supported above the shaft 15 by provision of a plurality of brackets 38 secured to the upper horizontal portion 39 of the wind shield frame. Secured to the brackets 38 is a hood for the shaft 15 to protect the latter against dust and to obscure the shaft, carriage and track from the view of the occupants of the vehicle. This hood comprises a stationary section 40 secured to the brackets 38 and a horizontal section 41 normally occupying the covering position shown in Figure 3 and capable of being elevated to allow access to the shaft and carriage for the purpose of lubrication or repair.

Formed integral with and extending downwardly from the carriage 30 is an arm 42 having a socket 43 in which the upper end of a connecting rod 44 is pivoted as indicated at 45. The lower end of the rod is pivotally connected to a wiping element 46 at a point medially of its ends, as indicated at 47. This wiping element is of conventional form, being provided with a flexible wiping lip 48 adapted to have wiping contact with a glass 49 in the wind shield. For the purpose of varying the degree of wiping contact of the wiping element with respect to the glass, and the connecting rod 44 is capable of lateral adjustment in its association with the arm 42 through the provision of a slot 50 in the arm through which extends a screw 51 having threaded engagement with the rod as shown in Figure 2. The major axis of the slot 50 is disposed horizontal to allow the horizontal adjustment of the screw and hence a horizontal adjustment of the rod 44 toward or away from the wind shield, thereby increasing and decreasing the contact pressure of the wiping element. It will be understood that the connecting rod can be locked in adjusted position by causing the head of the screw 51 to have binding engagement with arm 42.

The operation of the wiper is as follows: With the motor M energized the shaft 15 is continuously rotated in a clockwise direction as when viewed in Figure 3. Under this rotative movement of the shaft the carriage 30 through the coaction of the grooves 16, 17 and 18 with the head 32, travels the entire length of the shaft 15, first in one direction and then the other, thereby imparting to the wiping element 46 a reciprocating movement of such range as to completely traverse the upper portion of the wind shield glass and thereby maintain the entire upper portion of the glass clean. During the reciprocating of the carriage the roller 35 rides on the track 36, the roller and track co-operating to maintain the carriage in fixed position circumferentially with respect to the shaft so that the wiping element will at all times have proper wiping engagement with the surface of the glass. By virtue of the fact that the shaft is rotated in a clockwise direction as when viewed in Figure 3, the carriage tends to rotate in a corresponding direction owing to the frictional contact between the two. This tendency is utilized to urge the roller 35 into engagement with the track 36. Thus the possibility of the roller rattling during operation of the wiper is prevented.

It is to be particularly noted that the wiping element in its reciprocating movement across the wind shield moves to the free end of the glass before reversing its direction of movement. This is rendered possible through the structure of the bearing brackets. The space between the annuli 22 and 23 is sufficient to accommodate a portion of the carriage 30 so that the latter can travel beyond either end of the shaft a distance sufficient to permit the wiping element to reach either end of the glass.

Although I have herein shown and described only one form of wind shield wiper embodying my invention, it is to be understood that various changes may be made therein without departing from the spirit of the invention and the spirit and scope of the appended claims.

I claim:

1. Operating means for a windshield wiper, comprising a shaft on which a sleeve forming a carriage is adapted to be mounted for sliding movement, said shaft having intersecting spiral grooves connected at their ends by circumferentially extending grooves so as to make them continuous, and adapted to receive a projection in the sleeve whereby upon rotation of the shaft the projection will traverse the grooves to effect reciprocation of the sleeve on the shaft, the shaft having at one end a branch groove forming an alined continuation of one of the spiral grooves at its juncture with a transverse groove, and through which the projection is adapted to be passed into or removed from the grooves, to thereby permit the sleeve to be applied to and removed from the shaft, and a plug removably fitted in the groove.

2. Operating means for a windshield wiper, comprising a pair of brackets adapted to be secured to relatively narrow posts of a windshield frame to rotatably support a spirally grooved shaft upon which a carriage is adapted to be reciprocated from one side of the windshield to the other, said brackets having their confronting sides provided with recesses in which portions of the carriage are adapted to be received when the carriage is at the ends of its stroke for the purpose described.

BERT C. CHANDLER.